(12) United States Patent
Bunce et al.

(10) Patent No.: US 12,555,630 B2
(45) Date of Patent: Feb. 17, 2026

(54) DYNAMIC ADJUSTMENT OF SIGNAL DELAY WITH MEMORY ARRAY VOLTAGE

(71) Applicant: INTERNATIONAL BUSINESS MACHINES CORPORATION, Armonk, NY (US)

(72) Inventors: Paul Alan Bunce, Poughkeepsie, NY (US); Michael Lee, Austin, TX (US); Juergen Pille, Stuttgart (DE); Rolf Sautter, Bondorf (DE); Alexander Fritsch, Esslingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 18/584,023

(22) Filed: Feb. 22, 2024

(65) Prior Publication Data

US 2025/0273263 A1    Aug. 28, 2025

(51) Int. Cl.
*G11C 11/419* (2006.01)
(52) U.S. Cl.
CPC .................................. *G11C 11/419* (2013.01)

(58) Field of Classification Search
CPC ............................................ G11C 11/41–419
See application file for complete search history.

(56) References Cited

U.S. PATENT DOCUMENTS

| 7,646,658 | B2 | 1/2010 | Chen et al. |
|---|---|---|---|
| 7,864,625 | B2 | 1/2011 | Carpenter et al. |
| 2014/0084980 | A1 | 3/2014 | Adams et al. |
| 2020/0194047 | A1 | 6/2020 | Chen et al. |
| 2021/0118494 | A1* | 4/2021 | Jain .................. G11C 11/419 |

FOREIGN PATENT DOCUMENTS

| CN | 109637574 A | 4/2019 |
|---|---|---|
| KR | 101253533 B1 | 4/2013 |

* cited by examiner

*Primary Examiner* — Alfredo Bermudez Lozada
(74) *Attorney, Agent, or Firm* — Edward Wixted, Esq.; Kevin P. Radigan, Esq.; Heslin Rothenberg Farley & Mesiti P.C.

(57) ABSTRACT

A dynamic delay control is provided operatively coupled to control delay of a signal for a memory array based, in part, on an operating voltage (VDD) of the memory array. The dynamic delay control includes at least one diode limited delay element to dynamically adjust the delay of the signal with a change in the operating voltage to enhance tracking of the signal to performance of a memory cell operation of the memory array as the operating voltage changes.

17 Claims, 11 Drawing Sheets

DYNAMIC ADJUSTMENT OF SIGNAL DELAY WITH MEMORY ARRAY VOLTAGE

BACKGROUND

The present disclosure relates, in one or more aspects, to improving processing within a computing environment, and more particularly, to controlling delay of a signal for a memory array of the computing environment to enhance operation of the memory array over a range of operating voltages.

By way of example, static random access memory (SRAM) is a type of semiconductor memory. A memory array can be made up of SRAM cells, with each cell being capable of storing a bit of memory. A SRAM cell can be made up of several transistors. For example, in one traditional SRAM cell type, the SRAM cell is made up of six transistors. Four transistors form two crossed-coupled inverters for storing a bit of data. The other two transistors act as access transistors and allow one or more bitlines to access the crossed-coupled inverters. Turning OFF and ON the access transistors is controlled by a wordline connected to the gates of the access transistors. Other SRAM cell configuration types are also known in the art, as are other types of memory arrays.

SUMMARY

Shortcomings of the prior art are overcome, and additional advantages are provided herein through the provision of a system which includes a dynamic delay control operatively coupled to control delay of a signal for a memory array based, in part, on an operating voltage of the memory array. The dynamic delay control includes at least one diode limited delay element to facilitate dynamically adjusting the delay of the signal with a change in the operating voltage to enhance tracking of the signal to performance of a memory cell operation of the memory array as the operating voltage changes.

In another embodiment, a system is provided which includes a dynamic delay control operatively coupled to control a delay of a signal for a memory array based, in part, on an operating voltage (VDD) of the memory array. The dynamic delay control includes one delay element type to facilitate dynamically adjusting delay of the signal with a change in the operating voltage to enhance tracking of the signal to performance of a memory cell operation of the memory array as the operating voltage changes, with the memory array being one memory cell type. Further, the dynamic delay control includes another delay element type to further facilitate dynamically adjusting the delay of the signal with the change of the operating voltage to enhance tracking of the signal to the performance of the memory cell operation as the operating voltage changes, with the memory array being another memory cell type.

In a further aspect, a method is provided which includes controlling, using a dynamic delay control, a delay of a signal for a memory array based on an operating voltage of the memory array. The controlling includes dynamically adjusting, using one delay element type of the dynamic delay control, the delay of the signal with a change in the operating voltage to enhance tracking of the signal to performance of a memory cell operation of the memory array as the operating voltage changes, with the memory array being one memory cell type. In addition, the controlling includes dynamically adjusting, using another delay element type of the dynamic delay control, the delay of the signal with the change in the operating voltage to further enhance tracking of the signal to performance of the memory cell operation of the memory array as the operating voltage changes, with the memory array being another memory cell type.

Computer-implemented methods, computer systems and computer program products relating to one or more aspects are described and claimed herein. Each of the embodiments of the computer-implemented methods may be embodiments of each computer system and/or computer program product and vice-versa. Further, each of the embodiments is separable and optional from one another. Moreover, embodiments may be combined with one another. Each of the embodiments of the computer-implemented method may be combinable with aspects and/or embodiments of each computer system and/or computer program product, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
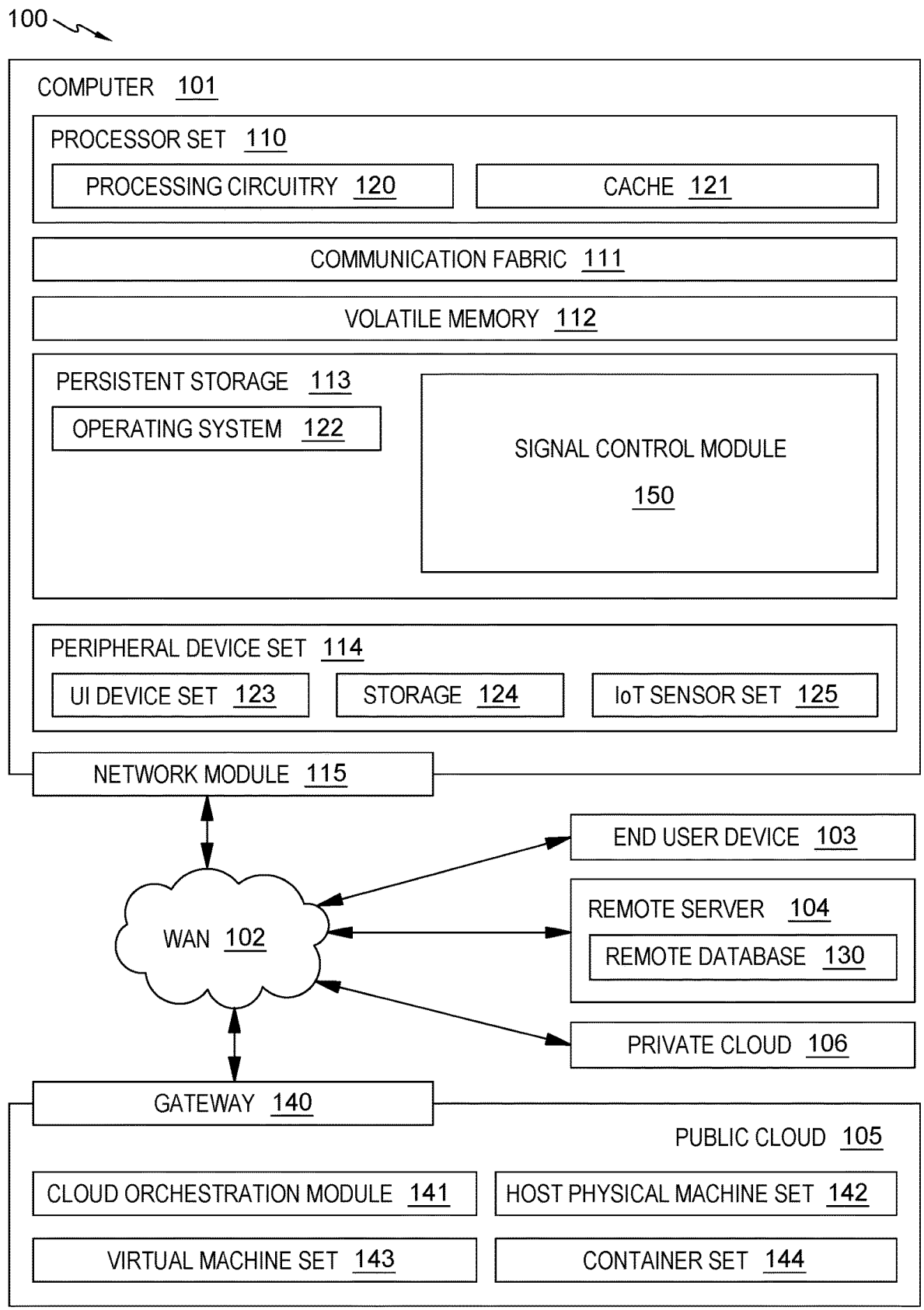
FIG. 1 depicts one example of a computing environment to incorporate and use one or more aspects of the present disclosure.

Provided herein, in one or more aspects, is a system which includes a dynamic delay control operatively coupled to control delay of a signal for a memory array based, in part, on an operating voltage (VDD) of the memory array. The dynamic delay control includes at least one diode limited delay element to facilitate dynamically adjusting the delay of the signal with a change in the operating voltage to enhance tracking of the signal to performance of a memory cell operation of the memory array as the operating voltage changes. The system, and in particular, the dynamic delay control, improves processing within a computing environment by improving operation of the memory array as operating voltage (VDD) changes. The dynamic delay control includes the at least one diode limited delay element to facilitate dynamically adjusting delay of the signal with a change in the operating voltage to enhance tracking of the signal to performance of a memory cell operation of the memory array as operating voltage changes. The at least one diode limited delay element operates as an automatic tracking circuit to facilitate proper functioning of the memory array, with no calibration or manual intervention required as operating voltage changes, for instance, within a range of voltages.

In embodiments, the dynamic delay control is, or includes, a pulse width control operatively coupled to control pulse width of the signal for the memory array based, in part, on the operating voltage in the memory array. The pulse width control includes the at least one diode limited delay element to facilitate dynamically adjusting pulse width of the signal with a change in the operating voltage to enhance tracking of the signal's pulse width to performance of a memory cell operation of the memory array as operating voltage changes.

In embodiments, the signal includes a pulsed clock signal, and the system further includes a local clock buffer providing the pulsed clock signal. In addition, in embodiments, the pulse width control is operatively coupled to the local clock buffer to dynamically adjust the pulse width of the signal with the change in the operating voltage. Advantageously, the pulse width control is operatively coupled to the local clock buffer to dynamically adjust the pulse width of the pulsed clock signal for the memory array with change in the operating voltage of the memory array. Dynamically adjusting the pulsed clock signal with change in the operating voltage allows for enhanced/proper functioning of the memory array as operating voltage varies. Improved memory array performance is achieved by dynamically providing the pulsed clock signal with a pulse width that tracks memory cell performance with change in operating voltage of the memory array.

In embodiments, the memory includes a static random access memory (SRAM) array, and a diode limited delay element of the at least one diode limited delay element includes an inverter and a diode limiting circuit electrically connected in series between the operating voltage and logic ground (VSS). Advantageously, the at least one diode limited delay element dynamically adjusts the pulse width of the signal with a change in the operating voltage to enhance tracking of the signal's pulse width to performance of a memory cell operation of the memory array as the operating voltage changes, where the memory array is an SRAM array. In an embodiment, a voltage of the diode limiting circuit tracks memory cell performance of the SRAM array as the operating voltage changes, where the SRAM array has a specified memory cell type.

In embodiments, the inverter includes a p-channel field effect transistor (PFET) and an n-channel field effect transistor (NFET) with drains electrically connected together, and the diode limiting circuit includes at least one N-diode delay element electrically connected between the inverter and logic ground (VSS). Advantageously, since SRAM array cell performance is typically NFET dominated, providing the diode limiting circuit with at least one N-diode delay element electrically connected between the inverter and logic ground better tracks the signal pulse width to performance of the memory cell operation as the operating voltage of the memory array changes, for instance, over a voltage range.

In embodiments, the at least one diode limited delay element varies the pulse width of the signal with the change in the operating voltage to track the signal's pulse width to performance of the memory cell operation, with the memory cell operation including a memory cell read of a memory cell of one memory cell type of the memory array. Processing within a computing environment is improved by controlling pulse width of the signal for the memory array based, in part, on the memory cell type of the memory array to better track the signal's pulse width to performance of the memory cell operation, such as where the memory cell operation includes a memory cell read of the one memory cell type.

In embodiments, the system further includes the memory array, and the memory cell is a complementary metal-oxide semiconductor (CMOS) static random access memory (SRAM) memory cell, and the operating voltage (VDD) is 0.7 volts or less. The at least one diode limited delay element facilitates enhanced control of the pulse width of the signal for the memory array based, at least in part, on the operating voltage of the memory array, and on the one memory cell type, where the memory array is a static random access memory (SRAM) array. Advantageously, the pulse width control is operatively coupled to control pulse width of the signal for the memory array based, in part, on the operating voltage (VDD), and in particular, in the case where the operating voltage is 0.7 volts or less. In such a low voltage range, the at least one diode limited delay element improves dynamic adjustment of the pulse width of the signal with change in operating voltage of the memory array to enhance tracking of the signal's pulse width with performance of the memory cell operation of the memory array as operating voltage of the memory array changes.

In embodiments, the pulse width control further includes at least one cascaded logic delay element electrically connected to the at least one diode limited delay element to facilitate adjusting the pulse width of the signal with the change in the operating voltage of the memory array to enhance tracking of the signal's pulse width to performance of the memory cell operation of the memory array as the operating voltage changes. In one embodiment, the at least one diode limited delay element and the at least one cascaded logic delayed element facilitate enhancing tracking of the signal's pulse width to performance of the memory cell operation of the memory array for different memory cell types of a plurality of memory cell types. Advantageously, the pulse width control improves processing within the computing environment by controlling pulse width of the signal for the memory array of the computing environment to enhance operation of the memory array as operating voltage changes. Further, a pulse width control including both at least one cascaded logic delay element and at least one diode limited delay element allows the pulse width control to be readily configured to automatically adjust the signal pulse width for different memory cell types of the plurality of memory cell types for the memory array.

In embodiments, the pulse width control further includes a control switch to selectively isolate the at least one diode limited delay element so that the at least one diode limited delay element is isolated from contributing to adjusting of the pulse width of the signal as the operating voltage changes, for a memory cell type of the plurality of memory cell types. The control switch and the selective isolating of the at least one diode limited delay element allows the same pulse width control (module, circuit, etc.) to be used with different memory arrays having different memory cell types of a plurality of memory cell types.

In embodiments, the system includes a sense amplifier to provide the signal, and the dynamic delay control is operatively coupled to the sense amplifier to control a delay in an activation signal of the sense amplifier. Advantageously, the dynamic delay control is operatively coupled to the sense amplifier to dynamically adjust the delay in the activation signal for the memory array with change in the operating voltage. Dynamically adjusting the activation signal with change in the operating voltage allows for enhanced/proper functioning of the memory array as operating voltage varies. Improved memory array performance is achieved by dynamically providing the activation signal with a delay that tracks memory cell performance with change in the operating voltage of the memory array.

In an additional aspect, another system is provided which includes a dynamic delay control operatively coupled to control a delay of a signal for a memory array based, in part, on an operating voltage (VDD) of the memory array. The dynamic delay control includes one delay element type to facilitate dynamically adjusting delay of the signal with a change in the operating voltage to enhance tracking of the signal to performance of a memory cell operation of the memory array as the operating voltage changes, with the memory array being one memory cell type. Further, the dynamic delay control includes another delay element type to further facilitate dynamically adjusting the delay of the signal with the change of the operating voltage to enhance tracking of the signal to the performance of the memory cell operation as the operating voltage changes, with the memory array being another memory cell type. Advantageously, improved processing within a computing environment is provided by the dynamic delay control being operatively coupled to control delay of the signal for the memory array based, in part, on the operating voltage (VDD) of the memory array. The dynamic delay control includes one delay element type to facilitate dynamically adjusting the delay of the signal with change in operating voltage to enhance tracking of the signal to performance of a memory cell operation of the memory array as operating voltage changes, with the memory array being one memory cell type; and another delay element type to further facilitate dynamically adjusting the delay of the signal with change in the operating voltage to enhance tracking of the signal to performance of the memory cell operation as operating voltage changes, with the memory array being another memory cell type. In this manner, the dynamic delay control is operable with different memory cell types for the memory array to enhance tracking of the signal to performance of the memory cell operation with changes in the operating voltage of the memory array. In embodiments, the one delay element type and the other delay element type both enhance tracking of the dynamic delay control to memory cell operation performance as operating voltage varies, such as during functional operation of the memory array, as well as during test of the memory array.

In embodiments of the other system, the one delay element type includes a cascaded logic delay element, and the other delay element type includes a diode limited delay element. The cascaded logic delay element facilitates enhanced tracking of the signal to performance of a memory cell operation of the memory array as operating voltage changes, with the memory array being one memory cell type; and the diode limited delay element enhances tracking of the signal to the performance of the memory cell operation as operating voltage changes, with the memory array being another memory cell type.

In embodiments of the other system, the dynamic delay control further includes a control switch to selectively isolate the other delay element type so that the other delay element type is isolated from contributing to adjusting of the delay of the signal as operating voltage of the memory array changes. The control switch allows for selective isolation of the other delay element type where the memory array includes the one memory cell type, rather than the other memory cell type. In this manner, the dynamic delay control can be configured to better modulate the signal's pulse width as operating voltage of the memory array varies for different memory cell types.

In embodiments of the other system, the dynamic delay control is, or includes, a pulse width control operatively coupled to control pulse width of the signal for the memory array based, in part, on the operating voltage of the memory array. In embodiments, the one delay element type and the other delay element type both enhance tracking of the pulse width control to memory cell operation performance as operating voltage varies, such as during functional operation of the memory array, as well as during test of the memory array. The pulse width control is operatable with different memory cell types for the memory array to enhance tracking of the signal's pulse width to performance of the memory cell operation when changes in the operating voltage of the memory array.

In embodiments of the other system, the signal includes a pulsed clock signal, and the system further includes a local clock buffer providing the pulsed clock signal, and the pulse width control is operatively coupled to the local clock buffer to dynamically adjust the pulse width of the signal with the change of the operating voltage of the memory array. Advantageously, the pulse width control is operatively coupled to the local clock buffer to dynamically adjust the pulse width of the pulsed clock signal for the memory array with change in operating voltage of the memory array. Dynamically adjusting the pulsed clock signal with change in the operating voltage of the memory array allows for enhanced/proper functioning of the memory array as operating voltage changes. Improved memory array performance is achieved by dynamically providing the pulsed clock signal with a pulse width that tracks memory cell performance with change in the operating voltage of the memory array.

In embodiments of the other system, the system includes the memory array and the memory operation includes a memory cell read of the memory array. Advantageously, the pulse width control, and in particular, the one delay element type and the other delay element type, facilitate tracking a signal's pulse width to performance of a memory cell read operation of the memory array as operating voltage changes for different memory cell types, including the one memory cell type and the other memory cell type.

In embodiments of the other system, the one memory cell type is one static random access memory (SRAM) cell type, and the other memory cell type is another static random access memory (SRAM) cell type. Advantageously, the pulse width control, and in particular, the one delay element type and other delay element type, facilitate dynamically adjusting the pulse width of the signal with change in operational voltage of the memory array to enhance tracking the signal's pulse width to performance of the memory cell operation of the memory array, where the one memory cell type is one static random access memory (SRAM) cell type, and the other memory cell type is another static random access memory (SRAM) cell type.

In a further aspect, a method is provided which includes controlling, using a dynamic delay control, a delay of a signal for a memory array based on an operating voltage (VDD) of the memory array. The controlling includes dynamically adjusting, using one delay element type of the dynamic delay control, the delay of the signal with a change in the operating voltage to enhance tracking of the signal to performance of a memory cell operation of the memory array as operating voltage changes, with the memory array being one memory cell type. In addition, the controlling includes dynamically adjusting, using another delay element type of dynamic delay control, the delay of the signal with the change in the operating voltage to further enhance tracking of the signal to performance of the memory cell operation of the memory array as the operating voltage changes, with the memory array being another memory cell type. Advantageously, improved processing within a computing environment is provided by controlling delay of the signal for the memory array based, in part, on the operating voltage (VDD) of the memory array. The controlling uses one delay element type of a dynamic delay control to facilitate dynamically adjusting delay of the signal with change in operating voltage to enhance tracking of the signal to performance of a memory cell operation of the memory array as operating voltage changes, with the memory array being one memory cell type; and uses another delay element type of the dynamic delay control to facilitate dynamically adjusting delay of the signal with change in the operating voltage to enhance tracking of the signal to performance of the memory cell operation as operating voltage changes, with the memory array being another memory cell type. In this manner, the dynamic delay control is operable with different memory cell types of the memory array to enhance tracking of the signal to performance of the memory cell operation with changes in the operating voltage of the memory array. In embodiments, the one delay element type and the other delay element type both enhance tracking of the dynamic delay control to memory cell operation performance as operating voltage varies, such as during functional operation of the memory array, as well as during test of the memory array.

In embodiments, the one delay element type includes a cascaded logic delay element, and the other delay element type includes a diode limited delay element. The cascaded logic delay element facilitates enhanced tracking of the signal's pulse width to performance of a memory cell operation of the memory array as operating voltage changes, where the memory array includes the one memory cell type; and the diode limited delay element enhances tracking of the signal's pulse width to the performance of the memory cell operation as operating voltage changes, where the memory array includes the other memory cell type.

In embodiments, the controlling further includes controlling a switch to selectively isolate the other delay element type so that the other delay element type is isolated from contributing to adjusting of the pulse width signal as the operating voltage changes, where the memory array includes the one memory cell type. The control switch allows for selective isolation of the other delay element type where the memory array includes the one memory cell type, rather than the other memory cell type. In this manner, the pulse width control can be configured to better modulate the signal's pulse width as operating voltage of the memory array varies for different memory cell types.

In embodiments, the dynamic delay control is, or includes, a pulse width control operatively coupled to control pulse width of the signal for the memory array based, in part, on the operating voltage of the memory array, and the signal is a pulsed local clock signal for the memory array, and the operating voltage (VDD) is 0.7 volts or less. Advantageously, dynamically adjusting the pulsed clock signal with change in operating voltage of the memory array allows for enhanced/proper functioning of the memory array as operating voltage varies. Improved memory array performance is achieved by dynamically providing the pulsed clock signal with a pulse width that tracks memory cell performance with change in operating voltage of the memory array, and in particular, where operating voltage is in the range of 0.7 volts or less, including, for instance, where the memory cell operation is a memory cell read operation. In such a low voltage range, the diode limited delay element improves dynamic adjustment of the pulse width of the signal with change in operating voltage of the memory array to enhance tracking of the signal's pulse width with performance to the memory cell operation of the memory array as operating voltage changes.

In a further aspect, another system is provided which includes a dynamic delay control (such as a pulse width control) operatively coupled to control delay of a signal for a memory array based, in part, on an operating voltage (VDD) of the memory array. The dynamic delay control includes at least one diode limited delay element to facilitate dynamically adjusting the delay of the signal with a change in the operating voltage to enhance tracking of the signal to performance of a memory cell operation of the memory array as the operating voltage changes. In embodiments, the signal includes a pulsed clock signal, and the system further includes a local clock buffer providing the pulsed clock signal, where the dynamic delay control includes a pulse width control operatively coupled to the local clock buffer to dynamically adjust the pulse width of the signal with the change in operating voltage. In embodiments, the memory array includes a static random access memory (SRAM) array, and the operating voltage is 0.7 volts or less. The system, and in particular, the dynamic delay control, improves processing within a computing environment by improving operation of the memory array as operating voltage varies. The dynamic delay control includes the at least one diode limited delay element to facilitate dynamically adjusting delay of the signal with a change in the operating voltage to enhance tracking of the signal to performance of a memory cell operation of the memory array as operating voltage changes. The at least one diode limited delay element operates as an automatic tracking circuit to facilitate proper functioning of the memory array, with no calibration or manual intervention required as operating voltage changes, and in particular, within a voltage range of 0.7 volts or less. Advantageously, the pulse width control, being operatively coupled to the local clock buffer to dynamically adjust the pulse width of the pulsed clock signal for the memory array with change in the operating voltage, enhances operation of the memory array. In particular, dynamically adjusting the pulsed clock signal with change in the operating voltage allows for enhanced/proper functioning of the memory array as operating voltage varies. Improved memory array performance is achieved by dynamically providing the pulsed clock signal with a pulse width that tracks memory cell performance with change in operating voltage of the memory array.

In embodiments of the other system, the memory array is a static random access memory (SRAM) array, and a diode limited delay element of the at least one diode limited delay element includes an inverter and a diode limiting circuit electrically connected in series between the operating voltage and logic ground (VSS). In embodiments, the diode limiting circuit includes at least one N-diode delay element electrically connected between the inverter and logic ground. Advantageously, since SRAM array cell performance is typically NFET dominated, providing the diode limiting circuit with at least one N-diode delay element electrically connected between the inverter and logic ground better tracks the signal delay to performance of the memory array cell operation of the memory array as operating voltage of the memory array varies, such as in the operating range of 0.7 volts or less. In one embodiment, the memory array operation includes a memory cell read operation.

In another aspect, a further system is provided which includes a dynamic delay control operatively coupled to control delay of a signal for a memory array based, in part, on an operating voltage (VDD) of the memory array. The dynamic delay control includes at least one cascaded logic delay element to facilitate dynamically adjusting the delay of the signal with the change of the operating voltage of the memory array to enhance tracking of the signal to performance of a memory cell operation of the memory array as operating voltage changes, where the memory array includes one memory cell type. In addition, the dynamic delay control includes at least one diode limited delay element type to further facilitate dynamically adjusting the delay of the signal with the change in the operating voltage to enhance tracking of the signal to the performance of the memory cell operation as the operating voltage changes, where the memory array includes another memory cell type. Advantageously, improved processing within a computing environment is provided by the dynamic delay control being operatively coupled to control delay of the signal for the memory array based, in part, on the operating voltage (VDD) of the memory array. As noted, the dynamic delay control includes at least one cascaded logic delay element to facilitate enhanced tracking of the signal to performance of the memory cell operation of the memory array as operating voltage changes, with the memory array being the one memory cell type; and the at least one diode limited delay element to facilitate enhanced tracking of the signal to performance of the memory cell operation as operating voltage changes, with the memory array being the other memory cell type. In this manner, the dynamic delay control is operable with different memory cell types of the memory array to enhance tracking of the signal to performance of the memory cell operation with changes in the operating voltage of the memory array. In embodiments, the at least one cascaded logic delay element and the at least one diode limited delay element both enhance tracking of the pulse width control to memory cell operation performance as operating voltage varies, such as during functional operation of the memory array, as well as during testing of the memory array.

In embodiments of the further system, the one memory cell type is one static random access memory (SRAM) cell type, and the other memory cell type is another static random access memory (SRAM) cell type. Advantageously, the dynamic delay control, and in particular, the at least one cascaded logic delay element and the at least one diode limited delay element, facilitate dynamically adjusting the delay of the signal with change in operating voltage of the memory array to enhance tracking of the signal to performance of the memory cell operation of the memory array, where the one memory cell type is one static random access memory (SRAM) cell type (such as an 8T SRAM cell type), and the other cell type is another static random access memory (SRAM) cell type (such as a 6T SRAM cell type).

In embodiments of the further system, the dynamic delay control further includes a control switch that selectively isolates the at least one diode limited delay element so that the at least one diode limited delay element is isolated from contributing to adjusting the delay of the signal as operating voltage changes. The control switch allows for selective isolation of the at least one diode limited delay element where the memory array includes the one SRAM cell type, rather than the other SRAM cell type. In this manner, the dynamic delay control can be configured to better modulate the signal's delay as operating voltage of the memory array varies for different memory cell types.

In a further aspect, another method is provided which includes controlling, using a dynamic delay control, delay of a signal for a memory array based on operating voltage (VDD) of the memory array. The controlling includes dynamically adjusting, using at least one cascaded delay element of the pulse width control, the delay of the signal with the change in the operating voltage to enhance tracking of the signal to performance of a memory cell operation of the memory array as the operating voltage changes, with the memory array being one memory cell type. In addition, the controlling includes dynamically adjusting, using at least one diode limited delay element of the dynamic delay control, the delay of the signal with the change in the operating voltage of the memory array to further enhance tracking of the signal to performance of the memory cell operation of the memory array as the operating voltage changes, with the memory array being another memory cell type. In embodiments, the memory array is a static random access memory (SRAM) array, and the one memory cell type is one SRAM cell type, and the other memory cell type is another SRAM cell type. For instance, in one embodiment, the one SRAM cell type is an 8 transistor SRAM cell type (8T SRAM), and the other memory cell type is a 6 transistor SRAM cell type (6T SRAM). Advantageously, improved processing within a computing environment is provided by the dynamic delay control being operatively coupled to control delay of the signal for the memory array based, in part, on the operating voltage (VDD) of the memory array. The dynamic delay control includes the at least one cascaded delay element to facilitate dynamically adjusting delay of the signal with change in operating voltage of the memory array to enhance tracking of the signal to performance of the memory cell operation of the memory array as operating voltage changes, where the memory array includes the one memory cell type; and the at least one diode limited delay element to facilitate dynamically adjusting delay of the signal with change in the operating voltage to enhance tracking of the signal to performance of the memory cell operation as operating voltage changes, where the memory array includes the other memory cell type. In this manner, the dynamic delay control is operable with different memory cell types of the memory array to enhance tracking of the signal to performance of the memory cell operation with changes in the voltage of the memory array. In embodiments, the delay elements enhance tracking of the delay to memory cell operation performance as operating voltage varies, such as during functional operation of the memory array, as well as during testing of the memory array. The dynamic delay control, and in particular, the at least one cascaded delay element and at least one diode limited delay element, facilitate dynamically adjusting the delay of the signal with change in operating voltage of the memory array to enhance tracking of the signal to performance of the memory cell operation of the memory array, where the one memory cell type is one static random access memory (SRAM) cell type, and the other cell type is another static random access memory (SRAM) cell type, with the 8T SRAM and 6T SRAM being examples of the one SRAM cell type and the other SRAM cell type, respectively.

In embodiments of the other method, the memory cell operation includes a memory cell read operation, and the operating voltage (VDD) is 0.7 volts or less. Advantageously, where operating voltage is in the range of 0.7 volts or less, the at least one cascaded delay element and the at least one diode limited delay element each improve dynamic adjustment of the delay of the signal with change in operating voltage of the memory array to enhance tracking of the signal with performance to the memory cell operation of the memory array as operating voltage changes.

In embodiments of the other method, the at least one cascaded delay element is at least one cascaded logic delay element, such as at least one cascaded n-channel field effect transistor (NFET) delay element, that dynamically tracks performance of a memory cell read operation for the one SRAM cell type, and the at least one diode limited delay element, such as at least one N-diode delay element, dynamically tracks performance of the memory cell read operation for the other SRAM cell type. Advantageously, the dynamic delay control, and in particular, the at least one cascaded logic delay element and at least one diode limited delay element, facilitate dynamically adjusting the delay of the signal with change in operating voltage of the memory array to enhance tracking of the signal to performance of a memory cell read of the memory array, where the one memory cell type is one static random access memory (SRAM) cell type, and the other cell type is another static random access memory (SRAM) cell type.

Aspects of the present disclosure and certain features, advantages, and details thereof, are explained more fully below with reference to the non-limiting example(s) illustrated in the accompanying drawings. Descriptions of well-known systems, devices, processing techniques, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, where the same or similar reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Note also that illustrative embodiments are described below using specific circuits, code, designs, architectures, protocols, layouts, schematics, systems, or tools only as examples, and not by way of limitation. Furthermore, the illustrative embodiments are described in certain instances using particular logic circuits, software, hardware, tools, and/or data processing environments only as example for clarity of description. The illustrative embodiments can be used in conjunction with other comparable or similarly purposed structures, systems, applications, architectures, etc. One or more aspects of an illustrative control embodiment can be implemented in hardware or software or a combination thereof.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and signal control module 150, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform signal control processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as signal control module 150. In addition to module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and module 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions (or logic) for performing the inventive methods may be stored (or located) in module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2A:
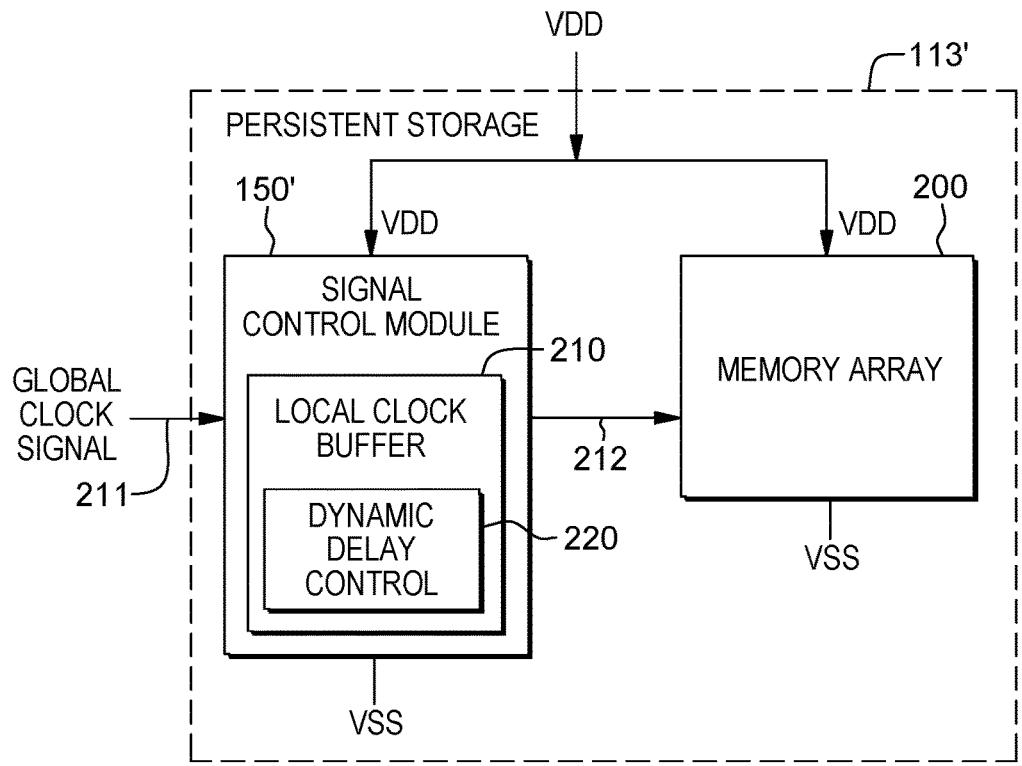
FIG. 2A depicts further details of one embodiment of a persistent storage of a computer, such as computer 101 of FIG. 1, in accordance with one or more aspects of the present disclosure.

FIG. 2A depicts one embodiment of a portion of a persistent storage 113' for a computer, such as for computer 101 of FIG. 1. As illustrated, persistent storage 113' includes, for instance, a signal control module 150', such as signal control module 150 of FIG. 1, and a memory array 200, such as any known memory array of a variety of available memory arrays. For instance, in embodiments, memory array 200 is a static random access memory (SRAM) array. In the embodiment of FIG. 2A, signal control module 150' includes a local clock buffer 210 with a dynamic delay control 220, in accordance with one or more aspects of the present disclosure. In operation, a global clock signal 211 is received at local clock buffer 210 and used to generate a pulsed local clock signal 212. Pulsed local clock signal 212 can be used, for instance, to access memory array 200. In one or more embodiments, pulsed local clock signal 212 can drive a wordline of memory array 200.

In an exemplary embodiment, a functional portion of an integrated circuit generates global clock signal 211, which is distributed to and used by other functional blocks within the circuit. These other functional blocks typically receive the global clock signal by way of respective local clock buffers (LCB), such as local clock buffer 210. In operation, the local clock buffers output the clock signals, or a related derivative of the global clock signal, for use by the functional blocks within the integrated circuit.

In an exemplary embodiment, for correct operation of a local clock buffer and an associated functional block, such as memory array 200, the pulse width of the output signal from the local clock buffer (e.g., local clock buffer 210) needs to be accurately characterized. In this regard, for example and not limitation, a pulse width that is too short can cause the local clock buffer to fail, and the functional circuitry operationally coupled to the local clock buffer to also not work correctly. In addition, where the functional circuitry requires and does not receive a precisely tuned pulse width output from the clock buffer, the functional circuitry may not operate correctly, such as described further herein.

In accordance with one or more aspects of the present disclosure, it is desirable that the signal pulse width of the local clock track memory cell performance where the associated functional block is a memory array. Ideally, the memory cell performance should be tracked over a wide range of conditions, including over a range of operating voltages (VDD) for the memory array. As noted, in embodiments, the pulsed signal generated by a pulsed local clock buffer (PLCB) is, or is used to generate, a signal to access a memory array. As described herein, with available pulsed local clock buffers, it has been discovered that the generated pulse width often does not expand proportionately with the time required to complete one or more memory cell operations, such as a memory cell read operation or an operation including a memory cell read. This is particularly true for lower operating voltages (VDD), such as 0.7 volts or less, and in particular, for voltages in the range of 6 volts or less, as explained below (and illustrated in FIG. 6). For instance, where the memory array is a static random access memory (SRAM) array, a memory cell read at a low voltage, such as 0.7 volts or less, may not operate correctly for certain memory cell types, such as a six transistor SRAM cell type (6T SRAM) or an eight transistor SRAM cell type (8T SRAM), as examples only.

Using conventional delay elements, such as logic gates, it has been determined that at low voltage ranges, the clock pulse width does not expand as much as the memory cells require to perform certain operations, such as a read operation or read and write operation. Addressing this issue, presented herein are various dynamic delay controls 220 (such as pulse width control circuits) that automatically adjust (in one embodiment) the signal pulse width with changes in supply or operating voltage (VDD) of the signal control module 150' and the memory array 200. When used as part of the delay that creates the memory element clock, the clock pulse width better tracks with memory cell performance for certain memory cell types, as described.

Note with reference to FIGS. 1 & 2A that, in one example, signal control module 150' (e.g., signal module 150 of FIG. 1) includes logic (e.g., circuits, other logic, etc.), code and/or instructions used to control pulse width of signal 212 to memory array 200 and/or perform other processing, in accordance with one or more aspects of the present disclosure. A signal control module (e.g., signal control module 150 (FIG. 1), signal control module 150' (FIG. 2A)) includes, in one example, various sub-modules to be used to perform processing of one or more aspects of the present disclosure. The sub-modules are implemented, as examples, as logic and/or computer readable program code (e.g., instructions). Based on being implemented in logic, the logic is located within and/or associated with storage, such as persistent storage 113 (FIG. 1), and persistent storage 113' (FIG. 2A). Based on one or more aspects being implemented as computer readable program code, the computer readable program code is in, for instance, computer readable storage media, such as storage (e.g., in FIG. 1 cache 121, persistent storage 113, storage 124 and/or other storage, as examples). The computer readable storage media may be part of one or more computer program products and the computer readable program code may be executed by and/or using one or more computing devices (e.g., one or more computers, such as computer(s) 101 (FIG. 1) and/or other computers; one or more processors or nodes, such as processor(s) or node(s) of processor set 110 and/or other processor sets and/or processors or nodes; processing circuitry, such as processing circuitry 120 of processor set 110 of FIG. 1 and/or other processor sets and/or other processing circuitry; and/or other computing devices, etc.). Additional and/or other computers, processors, nodes, processing circuitry and/or computing devices may be used to execute one or more of the sub-modules and/or portions thereof. Many examples are possible.

Figure 2B:
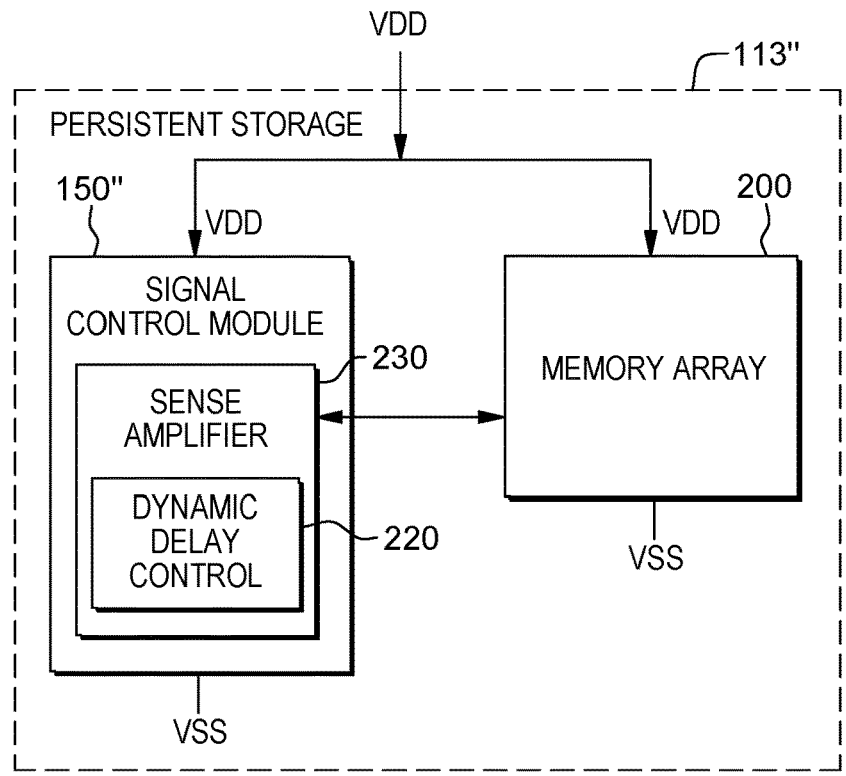
FIG. 2B depicts further details of another embodiment of a persistent storage of a computer, such as computer 101 of FIG. 1, in accordance with one or more aspects of the present disclosure.

FIG. 2B depicts another embodiment of a portion of a persistent storage 113" for a computer, similar to persistent storage 113' (FIG. 2A) and persistent storage 113 (FIG. 1), described above. In the example of FIG. 2B, signal control module 150" includes a sense amplifier 230, such as a sense amplifier circuit with dynamic delay control 220, such as described herein for controlling (in one embodiment) an activation signal for memory array 200 to facilitate one or more memory cell operations of memory array 200. In one operational embodiment, sense amplifier 230 monitors and obtains a differential across two or more bitlines of memory array 200, and uses the differential to facilitate a memory array operation, such as a memory cell read operation. The delay in the activation signal provided to memory array 200 by signal control module 150" is dynamically tailored, at least in part, by dynamic delay control 220 to track with memory cell performance within the memory array over a range of conditions, including a range of supply or operating voltages (VDD), and for one or more memory cell types. In one example, the dynamic delay control 220 associated with sense amplifier 230 facilitates providing a delayed activation signal which adjusts as the operational range of voltage VDD lowers. In one or more embodiments, dynamic delay control 220 described herein is particularly advantageous with operating voltages (VDD) in the range of 0.7 volts or less, such as 0.6 volts or less.

Figure 3:
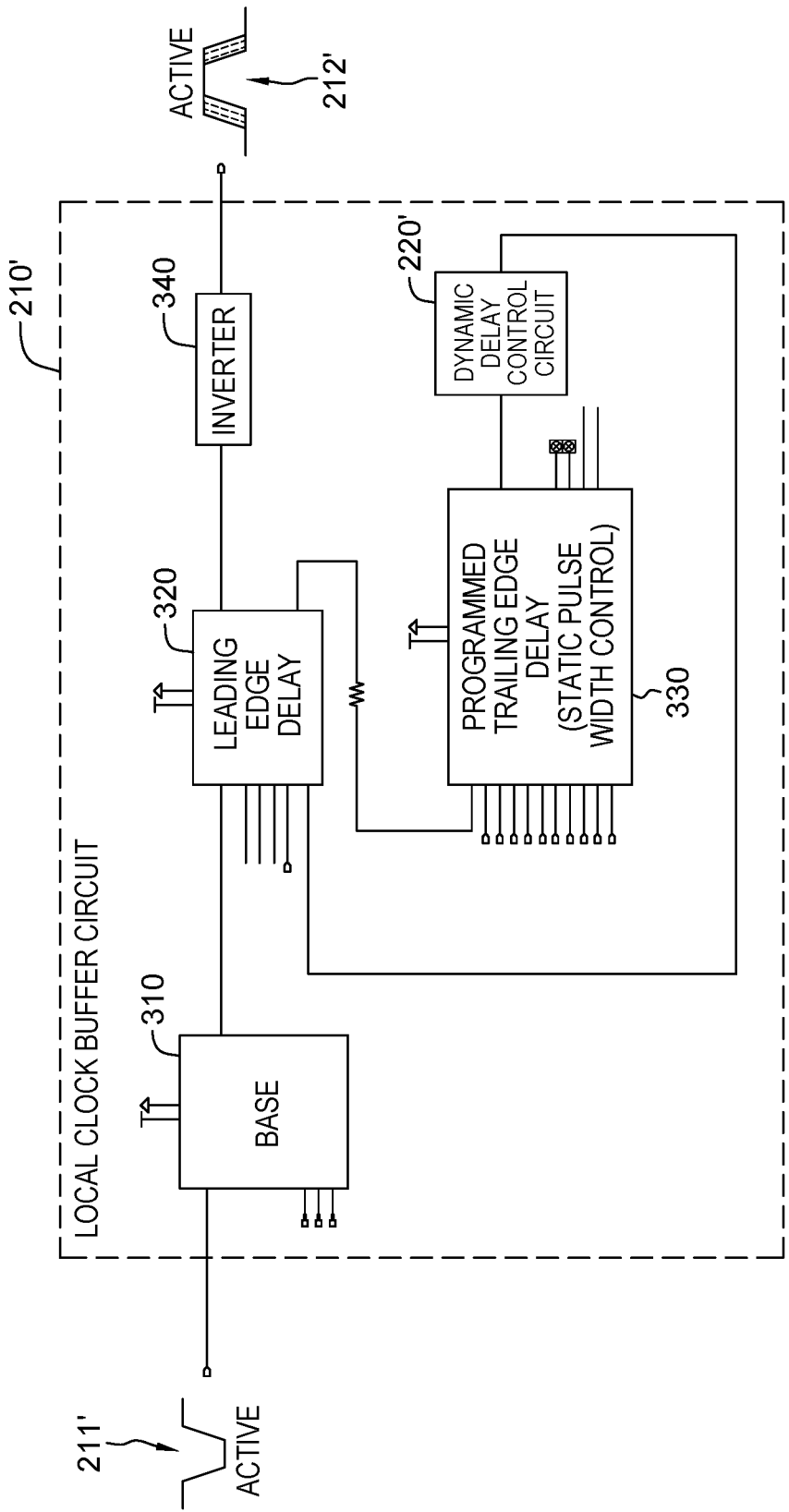
FIG. 3 is a block diagram of one embodiment of a local clock buffer circuit of a signal control module, such as the signal control module of FIG. 2A, in accordance with one or more aspects of the present disclosure.

FIG. 3. depicts one embodiment of a local clock buffer circuit 210', such as local clock buffer circuit 210 of FIG. 2A, in accordance with one or more aspects of the present disclosure. In FIG. 3, dynamic delay control 220 of FIG. 2 is implemented as a dynamic delay control circuit 220' (or dynamic pulse width control circuit), by way of example, with various logic embodiments of dynamic delay control circuit 220' being described below with reference to FIGS. 4-8.

As illustrated in FIG. 3, local clock buffer circuit 210' receives, in one embodiment, an active low global clock signal 211' and outputs, for instance, an active high signal 212' with a pulse width configured to track memory cell performance in the associated functional memory array, such as described above in FIGS. 2A-2B. Note that although principally described herein with reference to local clock buffer circuit 210', the dynamic delay control circuit 220' described can also be used in association with a sense amplifier, such as noted above with reference to FIG. 2B.

In the embodiment of FIG. 3, local clock buffer circuit 210' includes a base circuit or base block 310, a leading edge delay circuit 320, a programmed trailing edge delay circuit 330, and an inverter 340, along with a dynamic delay control circuit 220' (provided in accordance with one or more aspects of present disclosure). In one or more embodiments, base circuit 310 enables or disables the input clock signal from continuing through the local clock buffer circuit. In essence, base circuit 310 controls the activation of the local clock signal. In one embodiment, base circuit 310 is an inverter-type circuit with gates controlled by one or more control signals.

Leading edge delay circuit 320 controls the delay or lag for when the leading edge of the output signal 212' rises.

Together, the programmed trailing edge delay circuit 330 and the dynamic delay control circuit 220' control the delay to the trailing edge (falling edge as shown) of the output signal 212', and inverter 330 serves as a driver of the output signal 212'. The programmed trailing edge delay circuit includes various inputs to statically adjust the delay associated with this block. For instance, in one or more embodiments, the inputs to circuit 330 can be controlled mainly for testing, to be able to programmably vary the local clock pulse width when needed for testing. In one or more embodiments, the programmed trailing edge delay circuit 330 receives one or more control signals that define, in part, a specified base pulse width for the output signal 212'. In embodiments, these controls define the pulse width statically based on the control inputs.

In one or more aspects of the present disclosure, dynamic delay control circuit 220' is provided at an output of programmed trailing edge delay circuit 330 to automatically track or tailor the output signal 212' pulse width to memory cell performance within the associated memory array operatively coupled to receive the signal. As described, dynamic delay control circuit 220' provides (in one embodiment) dynamic control of the output signal's pulse width with a change in the operational voltage of the memory array to enhance tracking of the signal's pulse width to performance of a memory cell operation of the memory array as the operating voltage of the memory array changes.

In one or more embodiments, dynamic delay control circuit 220' automatically, dynamically adapts the output signal 212' pulse width to the needed signal pulse width for memory cells of the memory array to function properly as supply voltage to the memory array varies. In particular, the pulse width control, or pulse width control circuit, modulates the local clock buffer output signal, and thus modulates (for instance) the wordline pulse width, to track with performance of the associated memory cell type of the memory array as voltage is varied during functional operation, as well as during test, particularly at low supply voltages. Further, multiple pulse width control circuits are disclosed herein to dynamically track, for instance, performance of a memory cell operation as supply voltage is varied, based on the particular memory cell type included with in the memory array, with 6T SRAM and 8T SRAM cell types being discussed by way of example only.

Figure 4:
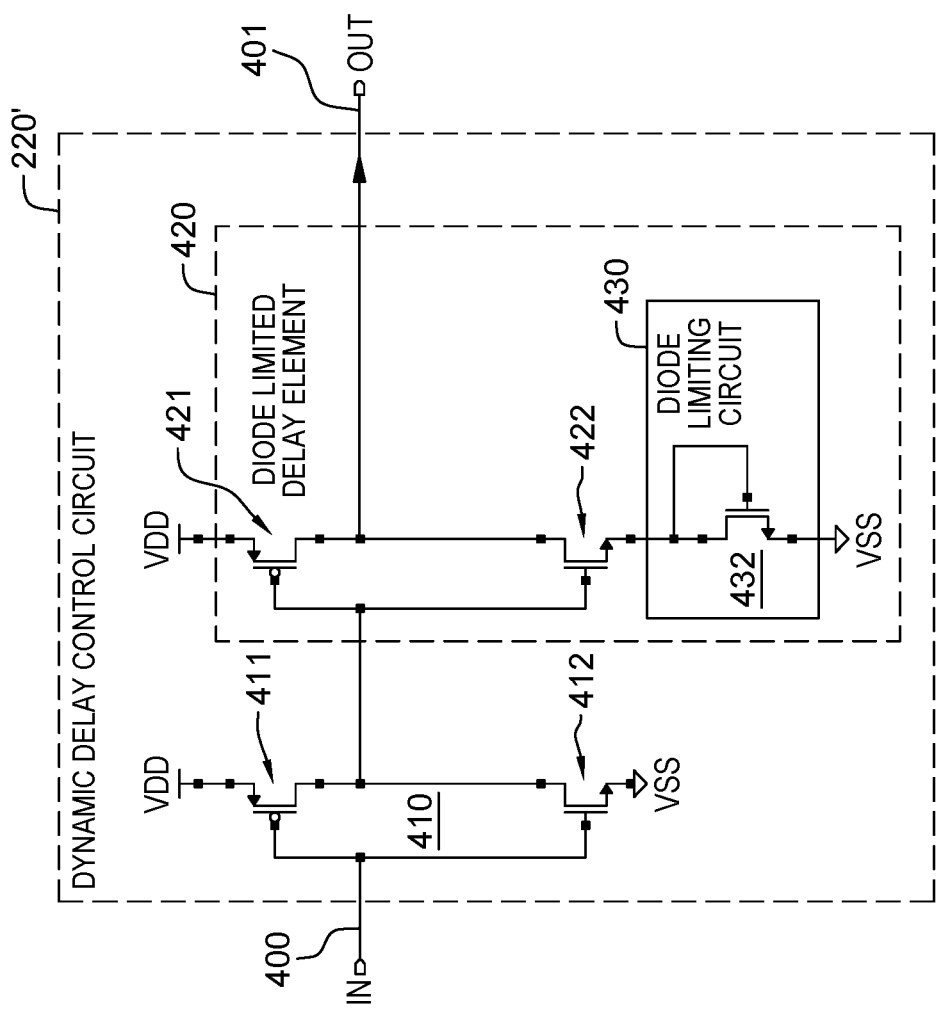
FIG. 4 depicts one embodiment of a dynamic delay control circuit for a local clock buffer circuit, such as the local clock buffer circuit of FIG. 3, in accordance with one or more aspects of the present disclosure.

FIG. 4 depicts further details of one embodiment of dynamic delay control circuit 220', in accordance with one or more aspects of the present disclosure. In this embodiment, dynamic delay control circuit 220' is logically a buffer from IN to OUT, where a diode limited delay element 420 delays the falling edge of the output signal 401, which defines or corresponds to, the falling edge of the local clock signal in the local clock buffer circuit 210' of FIG. 3. In operation, dynamic delay control circuit 220' receives an input 400, for instance, from programmed trailing edge delay circuit 330 (FIG. 3), and operates as an auto-tracking circuit to further expand, where needed, the pulse width of the local clock buffer output signal (i.e., the falling edge of signal 212' in the embodiment of FIG. 3).

As illustrated in FIG. 4, input signal 400 gates an inverter 410 which includes, for instance, a p-channel field effect transistor (PFET) 411 and an n-channel field effect transistor (NFET) 412 electrically connected between supply or operating voltage (VDD) and logic ground (VSS). The output of inverter 410 is at the connected drains of PFET 411 and NFET 412, with the output signal driving diode limited delay element 420. Diode limited delay element 420 is one example of an automatic, dynamic pulse width adjusting circuit in accordance with one or more aspects of the present disclosure, which allows for proper modulation of the local clock buffer output signal, or the wordline signal, as operating voltage (VDD) of the memory array and pulse width control circuit varies.

By way of example, diode limited delay element 420 includes an inverter, defined by a PFET 421 and an NFET 422, gated by the signal from inverter 410. In this embodiment, the diode limited delay element 420 inverter is electrically connected between operating voltage (VDD) and logic ground (VSS) across a diode limiting circuit 430. Diode limiting circuit 430 includes, in one embodiment, an NFET 432 electrically configured as a diode, and connected between NFET 422 of diode limited delay element 420 and ground (VSS). In operation, diode limiting circuit 430 controls the output signal 401 at the connected drains of PFET 421 and NFET 422. Diode limiting circuit 430 operates to extend the amount of time before the source of NFET 422 is pulled low (to ground VSS) and in so doing, to extend the pulse width of the signal output of the local clock buffer circuit. In this manner, diode liming circuit 430 operates to modulate the low voltage value at the source of NFET 422, and to increase the delay more as supply or operating voltage (VDD) goes low, such as 0.7 volts or lower. Diode limiting circuit 430 is electrically connected as part of the feedback path that determines the output pulse width, as in the embodiment of FIG. 3 described above.

Figure 6:
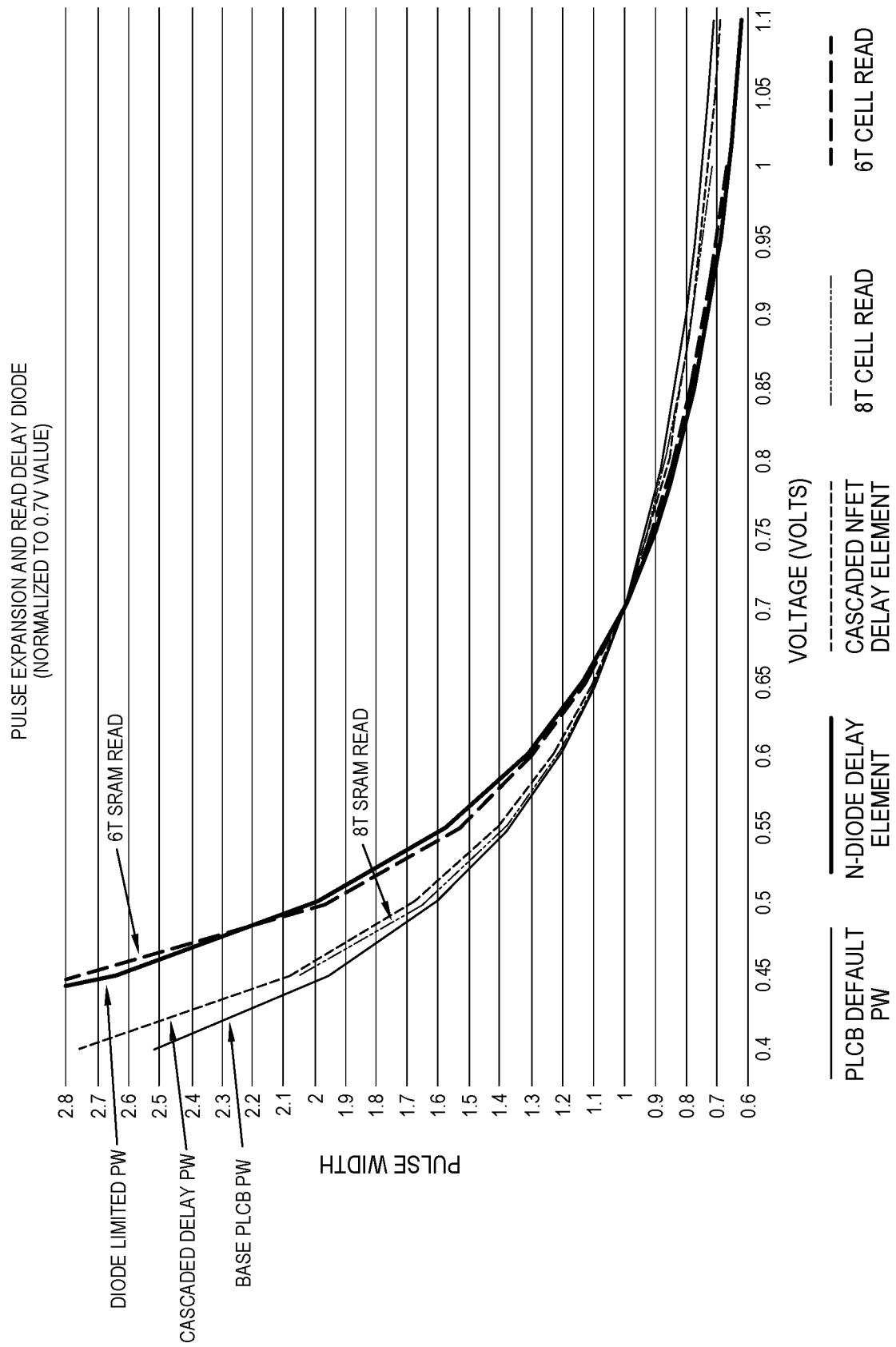
FIG. 6 graphically depicts change in pulse width with change in operating voltage of a memory array having one memory cell type and of a memory array having another memory cell type in comparison to a cascaded delay element-produced pulse width and in comparison to a diode limited delay element-produced pulse width, generated, for example, using the dynamic delay control circuits of FIGS. 4 & 5, in accordance with one or more aspects of the present disclosure.

Note that diode limited delay element 420 illustrates one embodiment only of an auto-adjusting delay circuit that facilitates proper functioning of the associated memory array. Advantageously, diode limited delay element 420 does not require any calibration or manual intervention in order to dynamically adjust the pulse width of the output signal of the local clock buffer circuit, to achieve a proper modulation of the output signal pulse width as operating voltage (VDD) varies. As explained herein, diode limited delay element 420 tracks with memory cell performance over a wide range of conditions, including low voltage ranges, where the clock pulse is to be expanded more to accommodate one or more memory cell operations for one or more memory cell types. For instance, in a six transistor static random access memory (6T SRAM) array, diode limited delay element 420 advantageously dynamically adjusts the output signal pulse width (as illustrated in FIG. 6) to allow sufficient time for certain memory cell operations of the 6T SRAM cell to properly complete, such as a memory cell read or a memory cell read and write operation.

In embodiments, note that diode limiting circuit 430 creates a low voltage at the source of NFET 422 that is equal to the Vt of the diode limiting circuit. As operating voltage gets lower, NFET 422 Vgs voltage gets lower faster than if the source voltage were VSS. This is how the falling delay of the OUT slows down in proportion to that of the SRAM cell performance. Note also that, in one or more embodiments, diode limiting circuit 430 is ON once the supply voltage is high enough to reach the Vt of the device. Where the memory array is a static random access array, the SRAM performance is typically based on a stack of two NFETs, that is, in most commercial SRAM arrays. When the SRAM cell is accessed, the bottom NFET in the memory array can see a glitch on its drain that is analogous to the diode limiting circuit 430 voltage, described herein. The Vt type and also the NFET size are factors in determining the voltage on the source of NFET 422. These will affect the amount of delay given by the diode limited delay element. Since the SRAM array cell performance is NFET dominated, NFETs are also used in the pulse width control circuits described herein.

Figure 5:
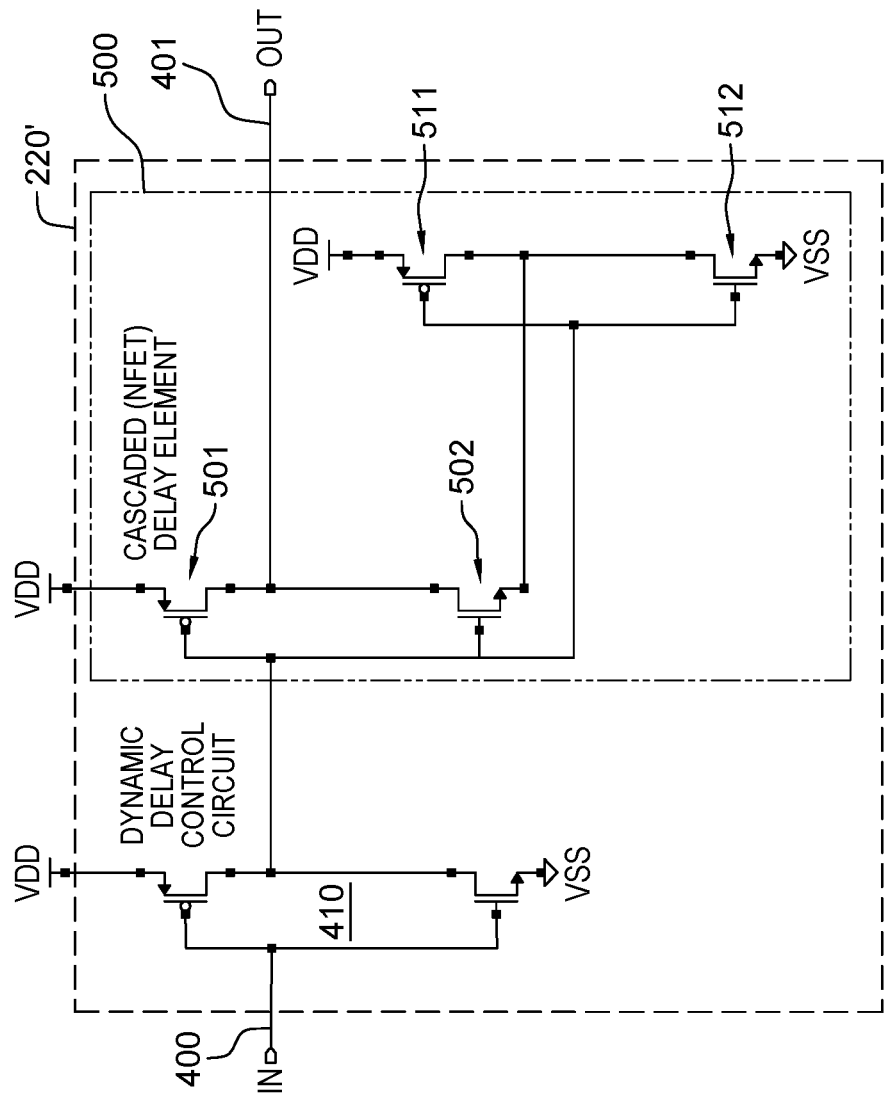
FIG. 5 depicts another example of a dynamic delay control circuit for a local clock buffer circuit, such as the local clock buffer circuit of FIG. 3, in accordance with one or more aspects of the present disclosure.

FIG. 5. illustrates another embodiment of dynamic delay control circuit 220', in accordance with one or more aspects of the present disclosure. The circuit embodiment of FIG. 5 is again logically a buffer from IN to OUT. As illustrated, a cascaded delay element 500, such as a cascaded NFET delay element, delays the falling edge of signal 401 at OUT, with a rising edge on the output of inverter 410 initiating triggering of the OUT to fall. In cascaded delay element 500, NFET 502 starts with its source high, and needs to be driven low to create a Vgs equal to or greater than Vt before the signal 401 at OUT can be driven low. This is how the falling transition of the OUT signal is delayed (in one example).

More particularly, in the embodiment of FIG. 5, a signal 400 at IN gates inverter 410, with the output at the connected drains of inverters 410 driving cascaded delay element 500, such as the cascaded NFET delay element illustrated, by way of example only. In one or more implementations, cascaded delay element 500 includes two or more cascaded logic inverters. As illustrated, the signal from inverter 410 gates the respective PFETs 501, 511 and NFETS 502, 512 of cascaded delay element 500, with the source of NFET 502 being electrically connected to the connected drains of PFET 511 and NFET 512 so that the inverter defined by PFET 511 and NFET 512 operates to delay the NFET 502 source from reaching the low voltage level VSS, and thus delays the pulse width of the pulse width control output from the dynamic delay control circuit 220', such as described herein.

Advantageously, dynamic delay control circuit 220' of FIG. 5 represents an embodiment where the delay element uses a similar structure to the memory cell structure of the memory array (such as a typical SRAM array), which provides better tracking of the resultant signal to memory element performance as operating voltage (VDD) changes. In one or more embodiments, the diode limited delay element 420 of dynamic delay control circuit 220' of FIG. 4 advantageously tracks performance over operating voltage changes to one memory cell configuration type, such as a 6T SRAM cell type, and the cascaded delay element 500 of dynamic delay control circuit 220' of FIG. 5 advantageously tracks memory cell performance over operating voltage variations to another memory cell configuration type, such as an 8T SRAM cell type.

The auto-tracking nature of the pulse width control circuits disclosed herein are depicted, by way of example, in FIG. 6, which illustrates, a base pulsed local clock buffer signal (BASE PLCB PW) generated, for instance, by programmed trailing edge delay circuit 330 (FIG. 3), in one embodiment, and the resultant cascaded delay pulse width (CASCADED DELAY PW) and the diode limited pulse width (DIODE LIMITED PW) signals generated by the automatic tracking circuits of FIGS. 5 and 4, respectively. As depicted the cascaded delay element 500 (FIG. 5) and the diode limited delay element 420 (FIG. 4) signals closely track the time required for an 8T SRAM read operation and 6T SRAM read operation as voltage VDD varies, and particularly, at lower supply voltages VDD, such as supply voltages below 0.7 volts. In accordance with one or more aspects disclosed herein, the pulse width control circuit is configured to provide the local clock output signal with a pulse width that automatically tracks performance of one or more memory cell operations based on the memory cell type employed in the memory array. Note that FIG. 6. depicts a normalized pulse width, and cell performance as a function of supply voltage. As supply or operating voltage (VDD) is lowered, both the CASCADED DELAY PW and DIODE LIMITED PW increase at a higher rate then the BASE PLCB PW. In the graph of FIG. 6., the default pulse width is defined at 0.7 volts, with a normalized value of 1.

Figure 7:
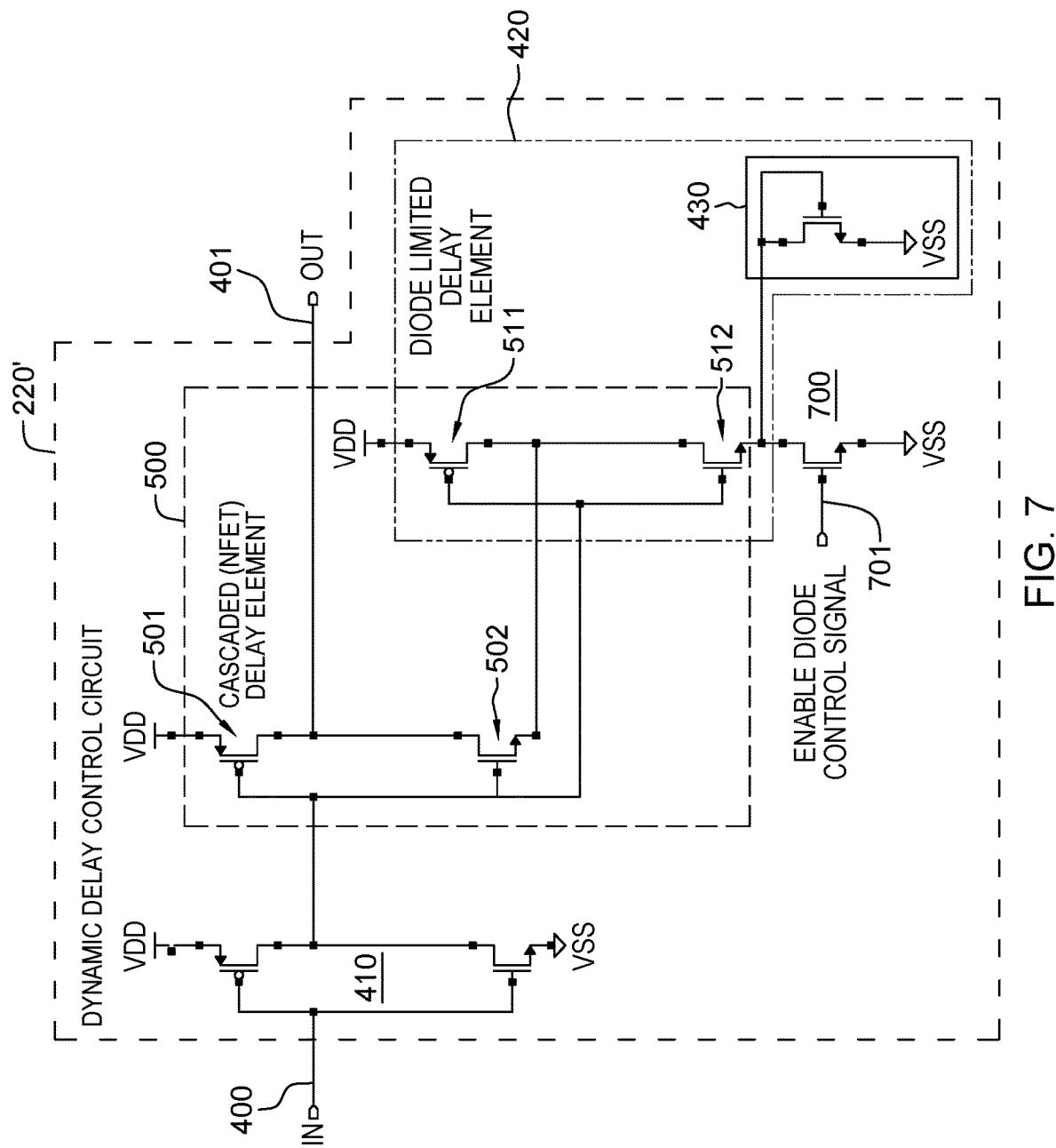
FIG. 7 depicts a further embodiment of a dynamic delay control circuit with both a cascaded logic delay element and a diode limited delay element, in accordance with one or more aspects of the present disclosure.

FIG. 7 illustrates a further embodiment of a dynamic delay control circuit 220' which combines the cascaded delay element 500 (FIG. 5) and diode limited delay element 420 (FIG. 4) by, for instance, electrically connecting diode limiting circuit 430 between the source of NFET 512 and logic ground (VSS). In the embodiment of FIG. 7, a control switch 700 is provided to control selective isolation of the diode limited delay element 420, in particular, the diode limiting circuit 430 of diode limited delay element 420 from contributing to the adjusting of the delay of the signal based on the operating voltage of the memory array and the dynamic delay control circuit. In this manner, dynamic delay control circuit 220' of FIG. 7 can be configured via an ENABLE DIODE CONTROL signal 701 for use with multiple different memory cell configuration types, such as the 6T SRAM and 8T SRAM cell types discussed. Note that when the ENABLE DIODE CONTROL signal 701 is ON, control switch 700 pulls the source of NFET 512 down to logic ground (VSS), and thus removes the added delay of diode limiting circuit 430 from effecting the signal's pulse width. In one or more implementations, the ENABLE DIODE CONTROL signal is set once for a given circuit design allowing, for instance, the dynamic delay control circuit 220' design of FIG. 7 to be used with multiple different types of memory arrays such as 6T SRAM arrays and 8T SRAM arrays, by way of example. In this manner, the ENABLE DIODE CONTROL signal can be used to either have the cascaded delay element 500 active (EDC=1) or to have diode limited delay element 420 active (EDC=0). In one embodiment, the ENABLE DIODE CONTROL signal can be selected once by the system at start-up based on the memory array specification.

Figure 8:
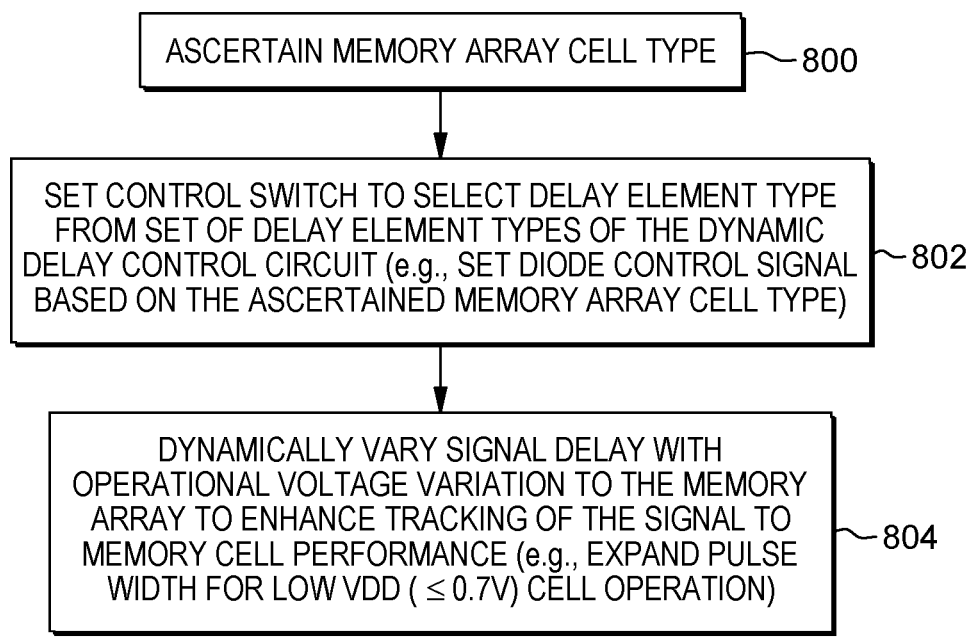
FIG. 8 depicts one example of a signal control workflow, in accordance with one or more aspects of the present disclosure.

FIG. 8 depicts one embodiment of a signal control workflow for a dynamic delay control circuit such as depicted in FIG. 7. The workflow begins with ascertaining the memory array's cell type 800. As noted, the memory array cell type can be obtained by the system at start-up based on the memory array specification. The control switch is set by the system to select the desired delay element type from a set of delay element types of the dynamic delay control circuit 802. For instance, the ENABLE DIODE CONTROL signal 701 for the dynamic delay control circuit 220' of FIG. 7 can be set based on the ascertained memory array cell type. Once set, the dynamic delay control circuit 220' (FIG. 7) dynamically varies the signal delay with supply voltage variation to the memory array to enhance tracking of the signal to memory array performance 804. For instance, the dynamic delay control circuit can automatically, dynamically expand the pulse width for low operating voltage (VDD) (e.g., 0.7 volts or less) cell operation.

Advantageously, dynamic delay control circuits are disclosed herein which are suitable for controlling a signal that needs to track memory cell performance of a memory array. The dynamic delay control circuits, or auto-tracking circuits, disclosed are provided as part of the delay circuitry that creates, for instance, a memory cell clock signal. The circuits disclosed allow the local clock buffer signal to automatically adapt to a desired wordline pulse width for the memory array as supply voltage (VDD) varies, both during functional operation, as well as during test. The dynamic delay control circuits provide (in one or more embodiments) an automatic, dynamic adjustment in the signal pulse width, tailoring the pulse width to the actual memory cell performance based on the memory cell type and the operating voltage (VDD) to the memory array. Advantageously, the resultant signal pulse width tracks memory element performance over a wide range of conditions, including over low operating voltage (VDD) ranges, where the clock pulse width needs to expand more than can be accommodated with existing pulse width variance circuitry that provides, a statically set base pulse width.

In one or more embodiments, disclosed herein are semiconductor circuits suitable for controlling a signal that needs to track performance of a memory cell operation, such as a memory cell read (e.g., SRAM memory read). In one or more embodiments, the signal is a pulsed local clock buffer (PCLB) signal for a memory array, and the semiconductor circuit, or pulse width control circuit, includes at least one cascaded logic delay element (e.g., at least one cascaded NFET delay element) that tracks performance over voltage variations for a first memory cell type and/or at least one diode limited delay element that tracks memory cell operation performance over voltage changes for a second memory cell type. In embodiments, the first and second memory cell types can be different SRAM cell types, such as 6T SRAM and 8T STAM cell types. Note that the 6T SRAM and 8T SRAM configurations are provided herein by way of example only. In one or more implementations, the dynamic delay control circuit further includes at least one control switch configured to control selection of the type of auto-tracking delay element being used with the dynamic delay control circuit, such as based on a predefined parameter. For instance, in one or more embodiments, at start-up or initialization, or during fabrication, the memory array cell type can be ascertained and used to set an ENABLE DIODE CONTROL signal to fix the type of auto-tracking circuit of the dynamic delay control circuit based on the particular memory cell configuration type employed in the memory array. In one or more implementations, the dynamic delay control circuit can be a combined circuit which includes one or more cascaded logic delay elements and one or more diode limited delay elements in one circuit, which can be used together to automatically modulate, for instance, the pulse width of the local clock buffer output signal, or can be used with only the cascaded logic delay element as the control circuit to dynamically track performance of the memory cell operation based on variation of one or more conditions of the memory array, including variation in operating voltage (VDD), such as at low range, of 0.7 volts or lower.

In one or more embodiments, a further step includes fabricating a physical integrated circuit, such as described herein, in accordance with the VLSI design. One non-limiting specific example that accomplishes this is described herein in connection with FIGS. 9-11. For example, a circuit design structure, based on the VLSI design, is provided to fabrication equipment to facilitate fabrication of a physical integrated circuit in accordance with the design structure.

In one or more embodiments, a layout is prepared based on the analysis. In one or more embodiments, the layout is instantiated as a design structure. In one or more embodiments, a physical integrated circuit is fabricated in accordance with the design structure.

Figure 9:
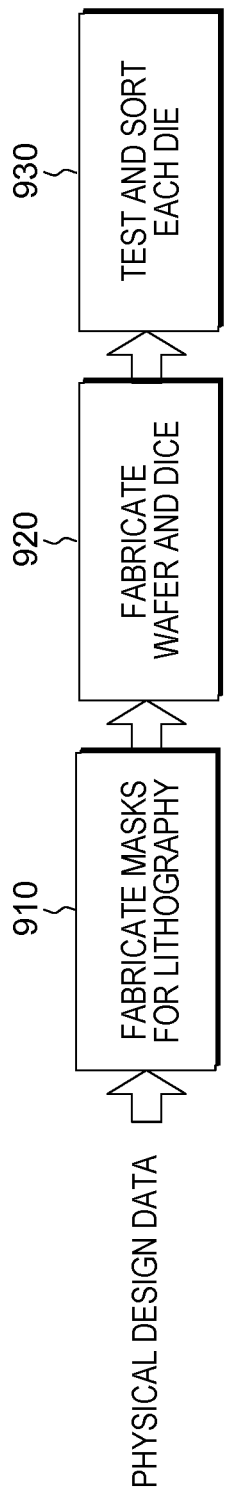
FIG. 9 is a flow diagram of a design process used in semiconductor design, manufacture, and test, in accordance with one or more aspects of the present disclosure.

As noted, in one or more embodiments, the layout is instantiated as a design structure. A physical integrated circuit is then fabricated in accordance with the design structure. Refer also to discussion for FIGS. 9-11. FIG. 9 is a flow diagram of a design process used in semiconductor design, manufacture, and/or test. Once the physical design data is obtained, based, in part, on the design processes described herein, an integrated circuit designed in accordance therewith can be fabricated according to known processes that are generally described with reference to FIG. 9. Generally, a wafer with multiple copies of the final design is fabricated and cut (i.e., diced) such that each die is one copy of the integrated circuit. At block 910, the processes include fabricating masks for lithography based on the finalized physical layout. At block 920, fabricating the wafer includes using the masks to perform photolithography and etching. Once the wafer is diced, testing and sorting each die is performed at 930 to filter out any faulty die. Furthermore, referring to FIGS. 9-11, in one or more embodiments the at least one processor is operative to generate a design structure for the integrated circuit design in accordance with the VLSI design, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of proper capacitance extraction) compared to circuits designed using prior art techniques, at least under conditions where there is the same CPU time budget for the design process. To achieve similar improvements with prior-art techniques, even if possible, would require expenditure of more CPU time as compared to embodiments of the invention.

Figure 10:
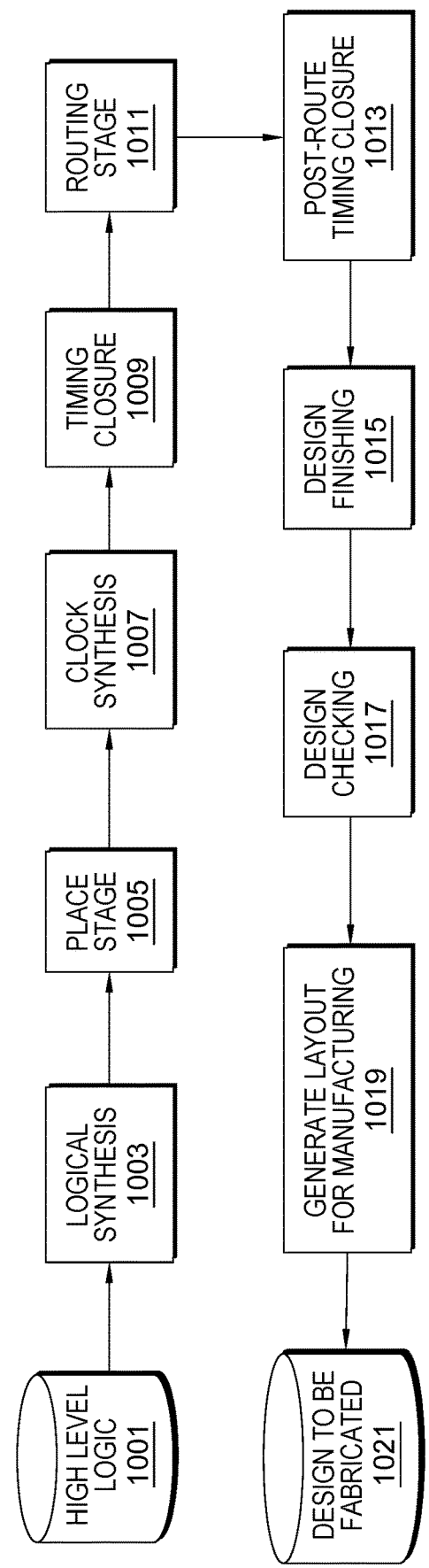
FIG. 10 depicts a further example of integrated circuit fabrication, including generating physical design data, in accordance with one or more aspects of the present disclosure.

FIG. 10 depicts an example high-level Electronic Design Automation (EDA) tool flow, which is responsible for creating an optimized microprocessor (or other IC) design to be manufactured. A designer can start with a high-level logic description 1001 of the circuit (e.g. VHDL or Verilog). The logic synthesis tool 1003 compiles the logic and optimizes it without any sense of its physical representation, and with estimated timing information. Placement tool 1005 takes the logical description and places each component, looking to minimize congestion in each area of the design. The clock synthesis tool 1007 optimizes the clock tree network by cloning/balancing/buffering the latches or registers. The timing closure step 1009 performs a number of optimizations on the design, including buffering, wire tuning, and circuit repowering; its goal is to produce a design which is routable, without timing violations, and without excess power consumption. Routing stage 1011 takes the placed/optimized design and determines how to create wires to connect the components, without causing manufacturing violations. Post-route timing closure 1013 performs another set of optimizations to resolve any violations that are remaining after the routing. Design finishing 1015 then adds extra metal shapes to the netlist, to conform with manufacturing requirements. Checking steps 1017 analyze whether the design is violating any requirements such as manufacturing, timing, power, electromigration or noise. When the design is clean, the final step 1019 is to generate a layout for the design, representing all the shapes to be fabricated in the design to be fabricated 1021.

Figure 11:
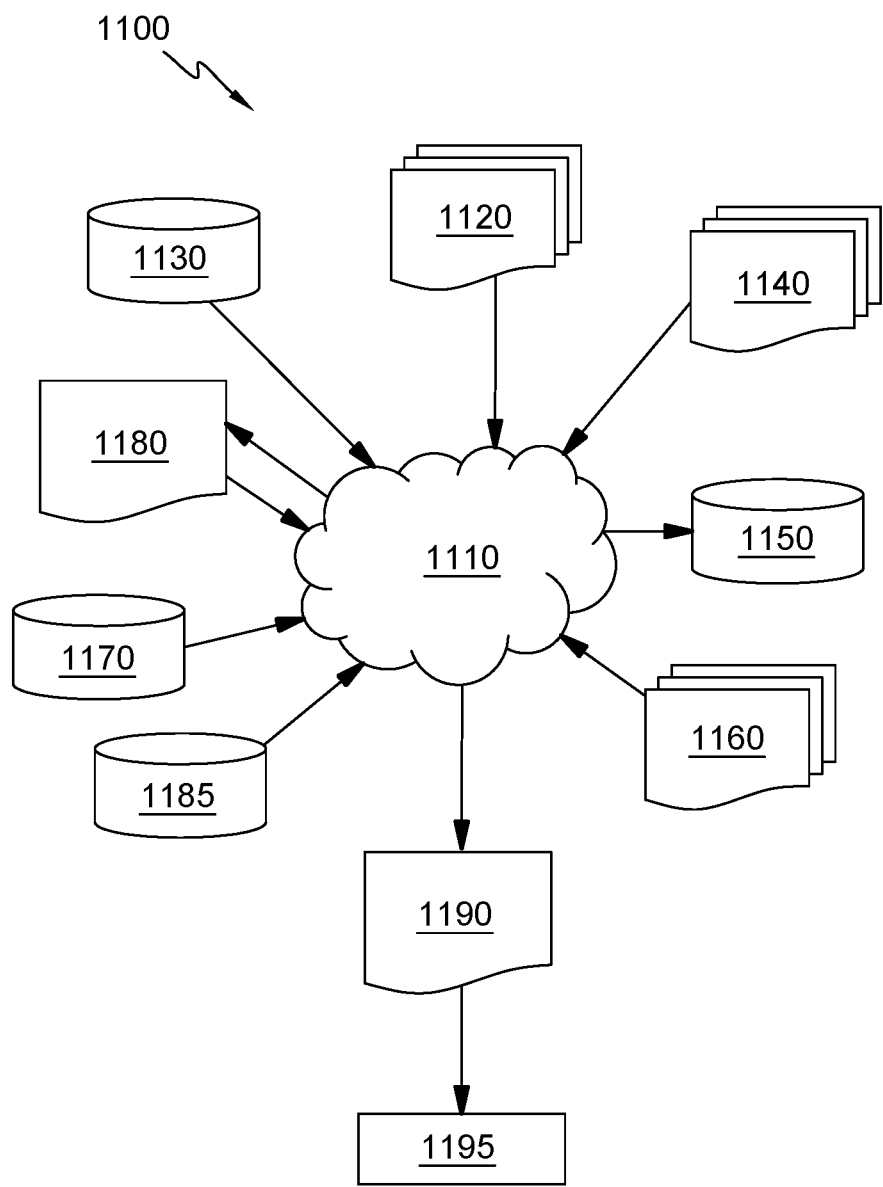
FIG. 11 shows an exemplary high level electronic design automation (EDA) tool flow, through which aspects of the present disclosure can be implemented.

One or more embodiments integrate the timing analysis techniques herein with semiconductor integrated circuit design simulation, test, layout, and/or manufacture. In this regard, FIG. 11 shows a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 1100 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., E-V writers), computers, or equipment for simulating design structures, any apparatus used in the manufacturing or test process, or any machines for programming functionality equivalent representations of the design structures into any medium (e.g., a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA).

FIG. 11 illustrates multiple such design structures 1120 that is preferably processed by a design process 1110. Design structure 1120 may be a logical simulation design structure generated and processed by design process 1110 to product a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD), such as implemented by a core developer/designer. When encoded on a gate array or storage medium of the loke, design structure 1120 may be accessed and processed by one or more hardware and/or software modules within design process 1110 to simulate or otherwise functionally represent an electronic component, circuit, electronic or logic module, apparatus, device, or system. As such, design structure 1120 may comprise files or other data structures including human and/or machine-readable source code, compiled structures, and computer executable code structure that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages, such as Verilog and VHDL, and/or higher level design languages, such as C or C++.

Design process 1110 preferably employs and incorporates hardware and/or software modules for synthesizing, translating, or otherwise processing a design/simulation functional equivalent of components, circuits, devices, or logic structures to generate a Netlist 1180, which may contain design structures such as design structure 1120. Netlist 1180 may comprise, for example, compiled or otherwise processed data structures representing a list of wires, discrete components, logic gates, control circuits, I/O devices, modules, etc., that describes the connections to other elements and circuits in an integrated circuit design. Netlist 1680 may be recorded on a machine-readable data storage medium or programmed into a programmable gate array, a compact flash, or other flash memory. Additionally, or in the alternative, the medium may be a system or cache memory, buffer space, or other suitable memory.

Design process 1110 may include hardware and software modules for processing a variety of input data structure system, including Netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 1170, and test data files 1185, which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc. Improved placement can be performed as described herein.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1120, design structure 1190 preferably comprises one or 10 more files, data structures, or other computer-encoded data or instructions that reside on data storage media and that when processed by an ECAD system generate a logically or otherwise functionally equivalent form of one or more IC designs or the like. In one embodiment, design structure 1190 may comprise a compiled, executable HDL simulation model that functionally simulates the devices to be analyzed.

Design structure 1190 may also employ a data format used for the exchange of layout data of integrated circuits. and/or symbolic data format (e.g. information stored in a GDSII (GDS2), GLI, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 1190 may then proceed to a stage 1195 where, for example, design structure 1190: proceeds to tape-out, is released to manufacturing, is released to a mask house, is sent to another design house, is sent back to the customer, etc.

The computing environments described herein are only examples of computing environments that can be used. One or more aspects of the present disclosure may be used with many types of environments. The computing environments provided herein are only examples. Each computing environment is capable of being configured to include one or more aspects of the present disclosure.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other memory access instructions may be used. Further, other predictors may be used, including, but not limited to, other examples of a counter table and/or a global counter. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the disclosure. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A system comprising:
a dynamic delay control operatively coupled to control delay of a signal for a memory array based, in part, on an operating voltage (VDD) of the memory array, wherein the dynamic delay control comprises:
at least one diode limited delay element to facilitate dynamically adjusting the delay of the signal with a change in the operating voltage to enhance tracking of the signal to performance of a memory cell operation of the memory array as the operating voltage changes; and
wherein the dynamic delay control comprises a pulse width control operatively coupled to control pulse width of the signal for the memory array based, in part, on the operating voltage of the memory array.

2. The system of claim 1, wherein the signal comprises a pulsed clock signal, and the system further comprises a local clock buffer providing the pulsed clock signal, and wherein the pulse width control is operatively coupled to the local clock buffer to dynamically adjust the pulse width of the signal with the change in the operating voltage.

3. The system of claim 2, wherein the memory array comprises a static random access memory (SRAM) array, and wherein a diode limited delay element of the at least one diode limited delay element comprises an inverter and a diode limiting circuit electrically connected in series between the operating voltage and logic ground (VSS).

4. The system of claim 3, wherein the inverter comprises a p-channel field effect transistor (PFET) and an n-channel field effect transistor (NFET) with drains electrically connected together, and the diode limiting circuit comprises at least one N-diode delay circuit electrically connected between the inverter and the logic ground.

5. The system of claim 2 wherein the at least one diode limited delay element varies the pulse width of the signal with the change in the operating voltage to the memory array to track the signal's pulse width to performance of the memory cell operation, with the memory cell operation including a memory cell read of a memory cell of one memory cell type of the memory array.

6. The system of claim 5 further comprising the memory array, and wherein the one memory cell is a complementary metal-oxide semiconductor (CMOS) static random access memory (SRAM) memory cell, and the operating voltage (VDD) is 0.7 volts or less.

7. The system of claim 1, wherein the pulse width control further comprises at least one cascaded logic delay element electrically connected to the at least the one diode limited delay element to facilitate adjusting the pulse width of the signal with the change in the operating volage of the memory array to enhance tracking of the signal's pulse width to performance of the memory cell operation of the memory array as the operating voltage of the memory array changes, the at least one diode limited delay element and the at least one cascaded logic delay element facilitating enhancing tracking of the signal's pulse width to performance of the memory cell operation of the memory array for different memory cell types of a plurality of memory cell types.

8. The system of claim 7, wherein the pulse width control further comprises a control switch to selectively isolate the at least one diode limited delay element so that the at least one diode limited delay element is isolated from contributing to adjusting of the pulse width of the signal as the operating voltage of the memory array changes, for a memory cell type of the plurality of memory cell types.

9. A system comprising:
a dynamic delay control operatively coupled to control delay of a signal for a memory array based, in part, on an operating voltage (VDD) of the memory array, the dynamic delay control comprising:
one logic delay element type to facilitate dynamically adjusting the delay of the signal with a change in the operating voltage to enhance tracking of the signal to performance of a memory cell operation of the memory array as the operating voltage changes, with the memory array being of one memory cell type;
another delay element type to further facilitate dynamically adjusting the delay of the signal with the change in the operating voltage to enhance tracking of the signal to the performance of the memory cell operation as the operating voltage changes, with the memory array being of another memory cell type; and
wherein the dynamic delay control comprises a pulse width control operatively coupled to control pulse width of the signal for the memory array based, in part, on the operating voltage of the memory array.

10. The system of claim 9, wherein the one delay element type includes a cascaded logic delay element, and the other delay element type includes a diode limited delay element, and wherein the dynamic delay control further comprises a control switch to selectively isolate the other delay element type so that the other delay element type is selectively isolated from contributing to adjusting of the delay of the signal as the operating voltage changes.

11. The system of claim 9, wherein the signal comprises a pulsed clock signal, and the system further comprises a local clock buffer providing the pulsed clock signal, and wherein the pulse width control is operatively coupled to the local clock buffer to dynamically adjust the pulse width of the signal with the change in the operating voltage.

12. The system of claim 11 further comprising the memory array, and wherein the memory cell operation includes a memory cell read of the memory array.

13. The system of claim 12, wherein the one memory cell type is one static random access memory (SRAM) cell type, and the other memory cell type is another static random access memory (SRAM) cell type.

14. A method comprising:
controlling, using a dynamic delay control, delay of a signal for a memory array based on an operating voltage (VDD) of the memory array, the controlling comprising:

dynamically adjusting, using one delay element type of the dynamic delay control, the delay of the signal with a change in the operating voltage to enhance tracking of the signal to performance of a memory cell operation of the memory array as the operating voltage changes, with the memory array being of one memory cell type;

dynamically adjusting, using another delay element type of the dynamic delay control, the delay of the signal with the change in the operating voltage to further enhance tracking of the signal to performance of the memory cell operation of the memory array as the operating voltage changes, with the memory array being of another memory cell type; and wherein the dynamic delay control comprises a pulse width control operatively coupled to control pulse width of the signal for the memory array based, in part, on the operating voltage of the memory array.

15. The method of claim 14, wherein the one delay element type includes a cascaded logic delay element, and the other delay element type includes a diode limited delay element.

16. The method of claim 15, wherein the controlling further comprises controlling a switch to selectively isolate the other delay element type so that the other delay element type is isolated from contributing to adjusting of the delay of the signal as the operating voltage changes, where the memory array has the one memory cell type.

17. The method of claim 15, wherein the signal is a pulsed local clock signal for the memory array, and the operating voltage (VDD) is 0.7 volts or less.

* * * * *